(12) United States Patent
Yamaguchi et al.

(10) Patent No.: US 8,347,713 B2
(45) Date of Patent: Jan. 8, 2013

(54) APPARATUS AND METHOD FOR MEASURING DYNAMIC RIGIDITY OF A MAIN SHAFT OF A MACHINE TOOL

(75) Inventors: Yoshiyuki Yamaguchi, Toyohashi (JP); Masato Sakakibara, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 314 days.

(21) Appl. No.: 12/775,821

(22) Filed: May 7, 2010

(65) Prior Publication Data
US 2010/0305898 A1    Dec. 2, 2010

(30) Foreign Application Priority Data

May 28, 2009 (JP) ................................. 2009-129465

(51) Int. Cl.
*G01M 1/00* (2006.01)
(52) U.S. Cl. .............................................. 73/460; 73/66
(58) Field of Classification Search ...................... 73/460, 73/657–660, 66, 649–651, 760
See application file for complete search history.

(56) References Cited

U.S. PATENT DOCUMENTS

| | | | |
|---|---|---|---|
| 4,644,261 A * | 2/1987 | Carter | 324/662 |
| 5,502,650 A * | 3/1996 | Naruse et al. | 700/279 |
| 5,734,108 A * | 3/1998 | Walker et al. | 73/650 |
| 6,763,285 B2 * | 7/2004 | Setiawan et al. | 700/279 |
| 7,252,000 B2 * | 8/2007 | Care et al. | 73/462 |

FOREIGN PATENT DOCUMENTS

| | | | |
|---|---|---|---|
| JP | 4-142435 A | | 5/1992 |
| JP | 07-270229 | * | 10/1995 |
| JP | 8-35951 A | | 2/1996 |
| JP | 11-019850 A | | 1/1999 |
| JP | 2004-181566 A | | 7/2004 |
| JP | 2005-74569 A | | 3/2005 |
| JP | 2006-181668 A | | 7/2006 |
| JP | 2007-276087 A | | 10/2007 |

OTHER PUBLICATIONS

International Search Report for International Patent Application No. PCT/JP2010/057341 mailed Jul. 13, 2010.

* cited by examiner

*Primary Examiner* — Helen C. Kwok
(74) *Attorney, Agent, or Firm* — Sughrue Mion, PLLC (57) ABSTRACT

An apparatus for measuring dynamic rigidity of a main shaft of a machine tool with high accuracy. The apparatus includes an unbalanced master that is attached to the main shaft and of which position of a center of gravity is offset with respect to a center of rotation of the main shaft; a tachometer that measures a rotational speed of the main shaft; and a run-out amount measuring device that is positioned so as to face the unbalanced master at a predetermined position in an axial direction and is any given position in a circumferential direction, and that measures an amount of run-out of the unbalanced master. The dynamic rigidity of the main shaft is calculated based on a relation between the rotational speed measured by the tachometer and the amount of run-out measured by the run-out amount measuring device.

6 Claims, 12 Drawing Sheets

APPARATUS AND METHOD FOR MEASURING DYNAMIC RIGIDITY OF A MAIN SHAFT OF A MACHINE TOOL

INCORPORATION BY REFERENCE

The disclosure of Japanese Patent Application No. 2009-129465 filed on May 28, 2009 including the specification, drawings and abstract is incorporated herein by reference in its entirety.

BACKGROUND OF THE INVENTION

The present invention relates to apparatuses and methods for measuring dynamic rigidity of a main shaft of a machine tool.

DESCRIPTION OF THE RELATED ART

Dynamic rigidity of main shafts (spindle portions) of machine tools is an important index of the machining accuracy of a work piece machined by the machine tool, and the like.

Thus, in, e.g., a method and apparatus for measuring dynamic rigidity of a machine tool spindle described in Japanese Patent Application Publication No. JP-A-H11-19850 using an electromagnet and a non-contact displacement sensor, while rotating a main shaft of the machine tool spindle, a part to be measured, such as the main shaft and a tool attached to the main shaft, is excited in a non-contact state by magnetic attraction force of the electromagnet, and displacement of the excited part is measured in a non-contact state by the non-contact displacement sensor. Thus, preferable machining conditions for a work piece can be quickly obtained based on the measured dynamic rigidity before the work piece is machined.

SUMMARY OF THE INVENTION

However, in the above conventional method and apparatus for measuring dynamic rigidity, exciting force is externally and forcibly applied to the main shaft, the tool attached to the main shaft, and the like by the magnetic attraction force of the electromagnet. The dynamic rigidity is calculated based on the relation between the applied exciting force and the displacement of the main shaft and the like. Thus, since a centrifugal force is applied to the main shaft and the like by the exciting force during rotation of the main shaft, the obtained dynamic rigidity value includes the value of the centrifugal force as an error.

The present invention has been developed in view of the above conventional problem, and it is an object of the present invention to provide an apparatus and method for measuring dynamic rigidity of a main shaft of a machine tool, which is capable of obtaining dynamic rigidity with high accuracy.

According to a first aspect of the present invention, an apparatus for measuring dynamic rigidity of a main shaft of a machine tool is characterized by including: an unbalanced master that is attached to the main shaft via a holder and of which position of a center of gravity is offset with respect to a center of rotation of the main shaft; a tachometer that measures a rotational speed of the main shaft; and a run-out amount measuring device that is positioned so as to face the unbalanced master at a position that is a predetermined position in an axial direction and is any given position in a circumferential direction, and that measures an amount of run-out of the unbalanced master, wherein the dynamic rigidity of the main shaft is calculated based on a relation between the rotational speed measured by the tachometer and the amount of run-out measured by the run-out amount measuring device.

According to a second aspect of the present invention, a method for measuring dynamic rigidity of a main shaft of a machine tool is characterized by including: using an unbalanced master of which position of a center of gravity is offset with respect to a center of rotation of the main shaft; attaching the unbalanced master to the main shaft via a holder, and positioning a run-out amount measuring device so as to face the unbalanced master at a position that is a predetermined position in an axial direction and is any given position in a circumferential direction; measuring, by the run-out amount measuring device, an amount of run-out of the unbalanced master when the unbalanced master is rotated by rotation of the main shaft; and calculating the dynamic rigidity of the main shaft based on a relation between a rotational speed of the main shaft and the amount of run-out measured by the run-out amount measuring device.

The apparatus and method for measuring the dynamic rigidity of the main shaft of the machine tool according to the present invention use the unbalanced master, the tachometer, and the run-out amount measuring device. Accordingly, the apparatus is easy to handle, and enables the dynamic rigidity to be measured with high accuracy.

More specifically, in the present invention, the unbalanced master attached to the main shaft via the holder is rotated by rotation of the main shaft of the machine tool. At this time, the unbalanced master is subjected to the centrifugal force since the position of the center of gravity of the unbalanced master is offset with respect to the center of rotation of the main shaft. This centrifugal force causes the unbalanced master to run out radially uniformly at each position in the circumferential direction.

Thus, the run-out amount measuring device of the present invention can be positioned so as to face the unbalanced master at any given position in the circumferential direction, in order to measure the amount of run-out of the unbalanced master. This can prevent an error to be caused in the measured amount of run-out depending on the position of the run-out amount measuring device in the circumferential direction of the main shaft of the machine tool.

In the present invention, exciting force is generated by using the centrifugal force generated by rotation of the unbalanced master. Thus, no external force needs to be applied to generate the exciting force, and the force that is generated by a rotating body itself as the main shaft, the holder, and the unbalanced master can be used to generate the exciting force. Thus, the dynamic rigidity of the main shaft can be obtained with high accuracy by calculation based on the relation between the rotational speed measured by the tachometer and the amount of run-out measured by the run-out amount measuring device.

Thus, the apparatus for measuring dynamic rigidity of a main shaft of a machine tool, which is capable of accurately obtaining dynamic rigidity, can be provided according to the first aspect of the present invention.

The method for measuring dynamic rigidity of a main shaft of a machine tool, which is capable of accurately obtaining dynamic rigidity, can be provided according to the second aspect of the present invention.

DETAILED DESCRIPTION OF THE EMBODIMENTS

Preferred embodiments of the above-described apparatus and method for measuring dynamic rigidity of the main shaft of the machine tool according to the present invention will be described below.

In the first and second aspects of the present inventions described above, it is preferable that, provided that m represents mass of the unbalanced master, r represents an amount of offset of the position of the center of gravity of the unbalanced master with respect to the center of rotation of the main shaft, ω represents a rotational angular velocity of the unbalanced master, and r' represents an amount of run-out of the unbalanced master that rotates at the rotational angular velocity, the apparatus be structured so as to calculate a centrifugal force F based on $F=m\times+r')\times\omega^2$, and to calculate the dynamic rigidity G based on $G=r'/F$.

In this case, the dynamic rigidity of the main shaft of the machine tool can be easily and accurately obtained.

It is preferable that the unbalanced master be shaped so that a part of a cylindrical material in a circumferential direction is cut out along an axial direction.

In this case, the shape of the unbalanced master is appropriate, and the amount of run-out of the unbalanced master can be accurately measured by the run-out amount measuring device. The position of the center of gravity of the unbalanced master with respect to the center of rotation of the main shaft can be easily determined.

Embodiments

Embodiments of an apparatus and method for measuring dynamic rigidity of a main shaft in a machine tool according to the present invention will be described below with reference to the accompanying drawings.

First Embodiment

Figure 1:
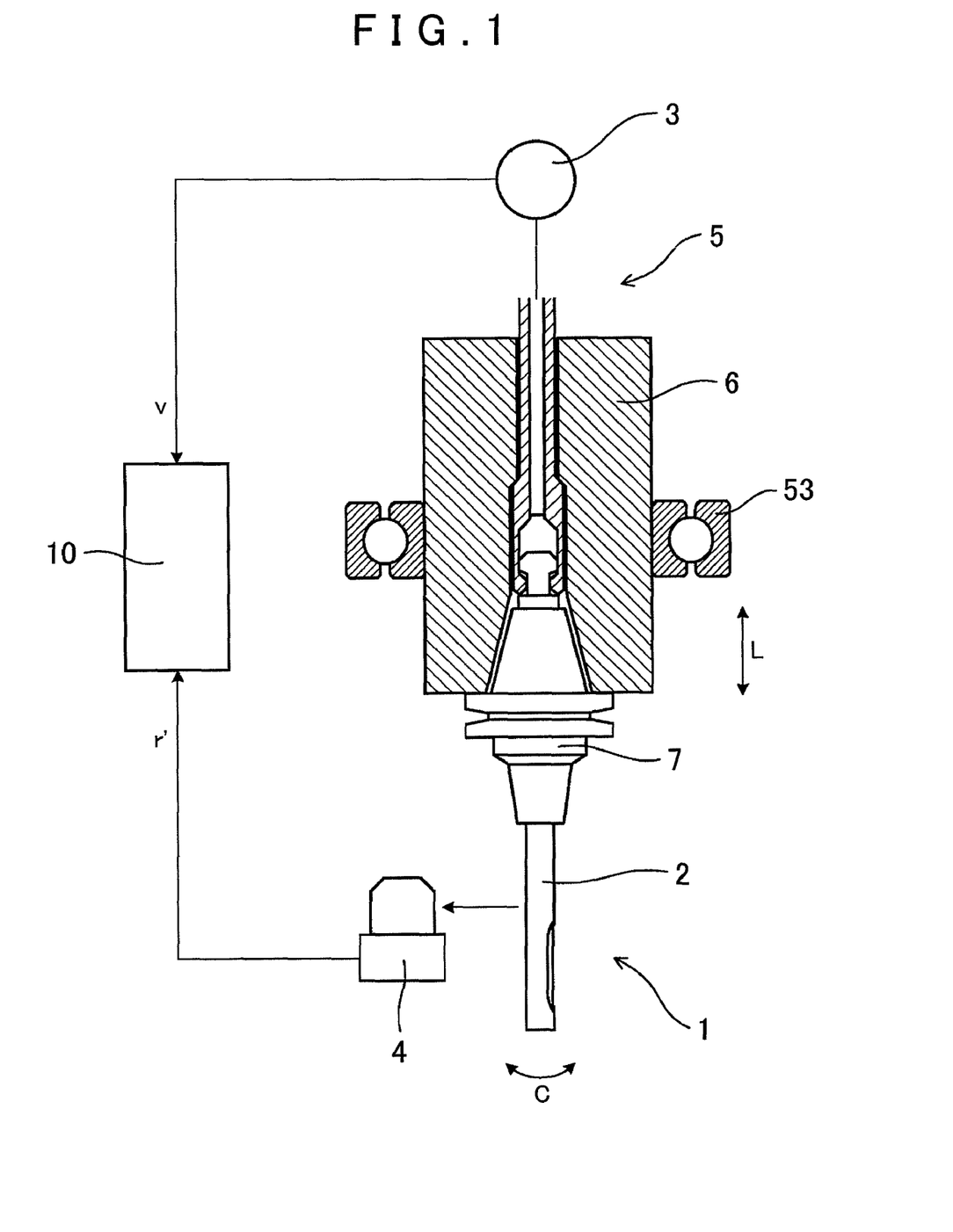
FIG. 1 is an illustration showing the structure of an apparatus for measuring dynamic rigidity according to a first embodiment.
Figure 2:
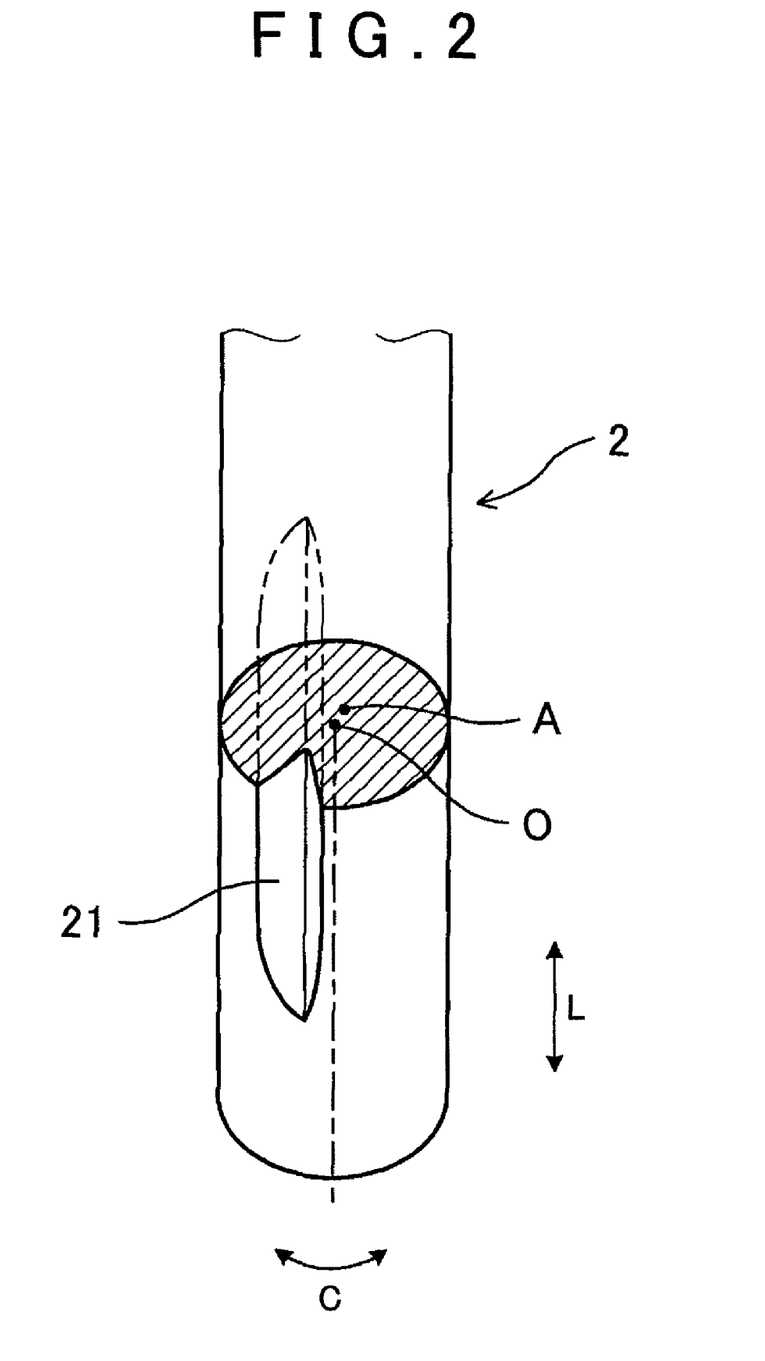
FIG. 2 is a perspective view showing a first unbalanced master according to the first embodiment.

As shown in FIGS. 1 and 2, a dynamic rigidity measuring apparatus 1 for measuring dynamic rigidity of a main shaft 6 of a machine tool 5 according to the present embodiment has an unbalanced master 2, a tachometer 3, and a run-out amount measuring device 4. The unbalanced master 2 is attached to the main shaft 6 via a holder 7, and a position A of the center of gravity of the unbalanced master 2 is offset with respect to the center of rotation O of the main shaft 6. The tachometer 3 measures the rotational speed of the main shaft 6. The run-out amount measuring device 4 is positioned so as to face the unbalanced master 2 at a position that is a predetermined position in an axial direction L of the unbalanced master 2 and is any given position in a circumferential direction C of the unbalanced master 2, and measures the amount of run-out of the unbalanced master 2. The dynamic rigidity measuring apparatus 1 is structured so as to calculate dynamic rigidity of the main shaft 6 based on the relation between the rotational speed measured by the tachometer 3 and the amount of run-out measured by the run-out amount measuring device 4.

The dynamic rigidity measuring apparatus 1 and a method for measuring dynamic rigidity of the main shaft 6 of the machine tool 5 according to the present embodiment will be described in detail with reference to FIGS. 1 through 10.

As shown in FIG. 1, the machine tool 5 of the present embodiment is a machining center structured so that a plurality of kinds of tools can be replaced one another to be attached to the main shaft 6 by the holder 7. The tachometer 3 of the present embodiment is attached to the main shaft 6 of the machine tool 5. The run-out amount measuring device 4 of the present embodiment measures the amount of run-out of the unbalanced master 2 by shooting a projected image of the unbalanced master 2 in a non-contact manner. More specifically, the run-out amount measuring device 4 of the present embodiment captures images of the unbalanced master 2 at predetermined sampling intervals during rotation of the unbalanced master 2 to obtain the diameter of the unbalanced master 2 during rotation of the unbalanced master 2. The run-out amount measuring device 4 obtains the amount of run-out based on the difference between the diameter of the unbalanced master 2 during rotation of the unbalanced master 2 and the diameter of the unbalanced master 2 while the unbalanced master 2 is stationary. Provided that D1 represents the diameter during rotation of the unbalanced master 2, and D0 represents the diameter while the unbalanced master 2 is stationary, this amount of run-out r' can be obtained by $r'=(D1-D0)/2$.

The sampling intervals are determined so as not to synchronize with the rotation cycle of the main shaft 6 so that the run-out amount measuring device 4 can capture the image of the entire circumference of the unbalanced master 2.

Figure 3:
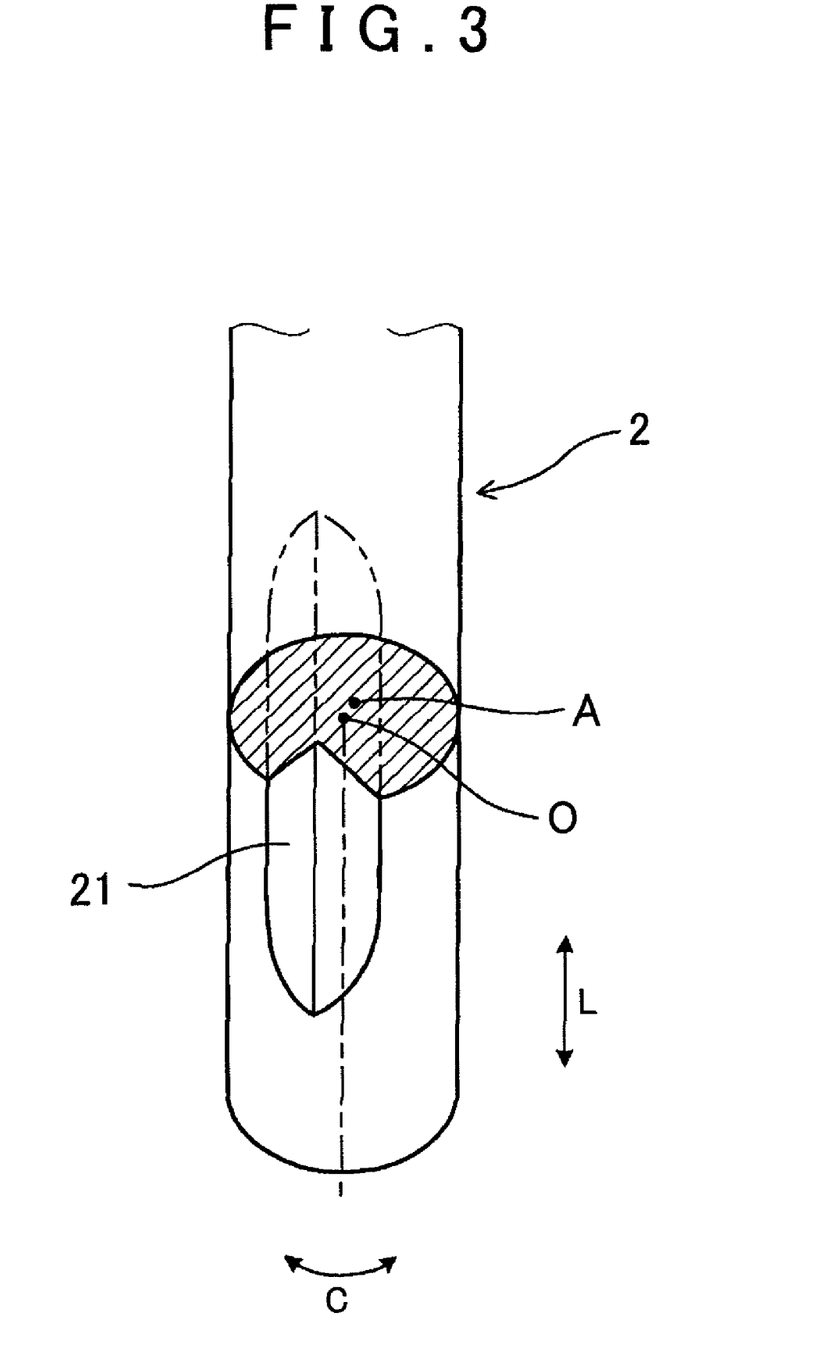
FIG. 3 is a perspective view showing a second unbalanced master according to the first embodiment.

As shown in FIGS. 2 and 3, the unbalanced master 2 of the present embodiment is shaped so that a part of a cylindrical material in the circumferential direction C is cut out along the axial direction L. The position A of the center of gravity of the unbalanced master 2 can be changed by determining as appropriate the range of an angle by which the cylindrical material is cut out. FIG. 2 shows a first unbalanced master 2 formed by providing a cut-out 21 of 45° in a cylindrical material, and FIG. 3 shows a second unbalanced master 2 formed by providing a cut-out 21 of 90° in a cylindrical material. A centrifugal force that is generated by the unbalanced master 2 can be changed as appropriate by changing the position A of the center of gravity of the unbalanced master 2.

Figure 4:
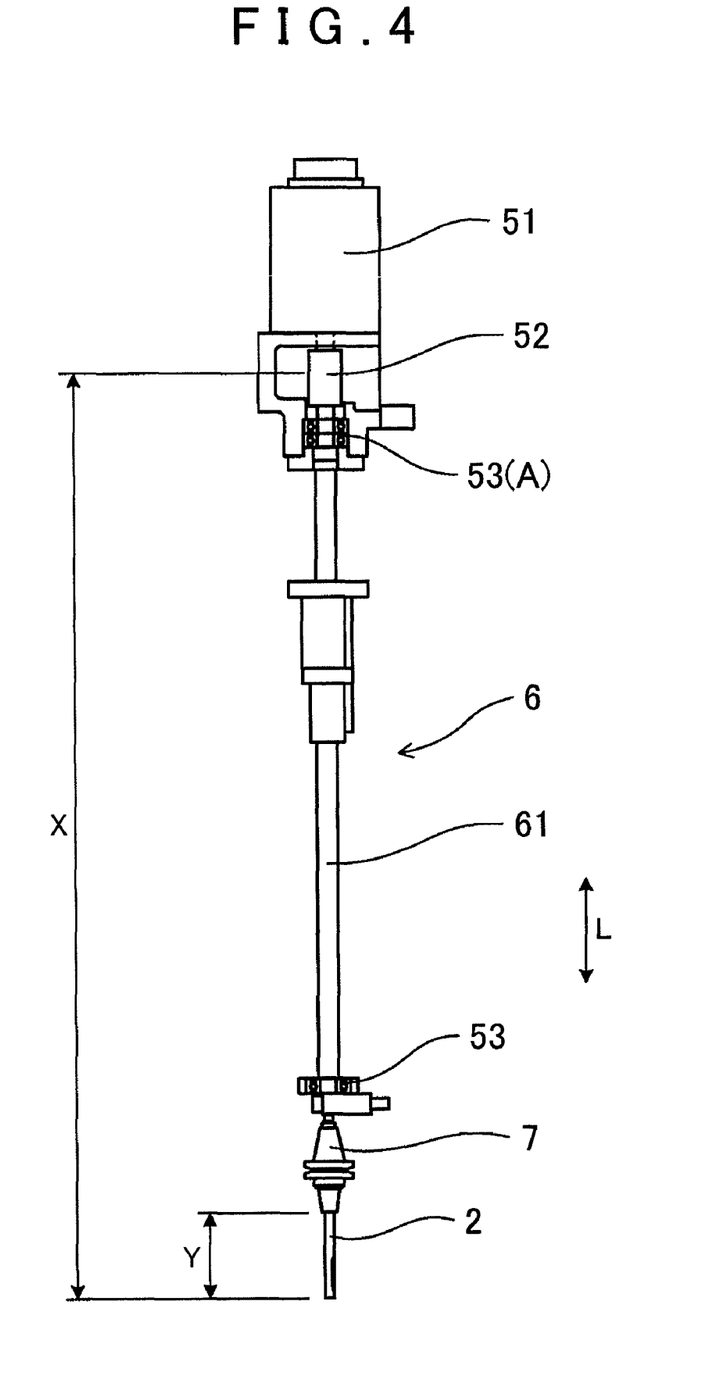
FIG. 4 is an illustration showing the structure of a main shaft according to the first embodiment.

FIG. 4 shows the structure of the main shaft 6 that is rotated by a motor 51 as a driving source. The main shaft 6 is formed by a drawbar 61 that is coupled to an output shaft of the motor 51 via a coupling portion (a coupling) 52. The coupling 52 absorbs an offset between the shaft center of the output shaft of the motor 51 and the shaft center of the drawbar 61. The drawbar 61 is rotatably supported by bearings 53 at an upper end located near the coupling 52 and a lower end, respectively. The upper bearing 53A located closer to the coupling (the coupling portion) 52 has greater strength in order to suppress whirling of the drawbar 61 and to reduce the load on the drawbar 61.

The unbalanced master 2 or a tool for performing various kinds of machining is attached to the lower end of the drawbar 6 via the holder 7. The fulcrum point of run-out of the unbalanced master 2 or the tool is regarded as being located near the coupling 52 or the upper bearing 53A.

Provided that X represents the distance from the tip end (the lower end) of the unbalanced master 2 or the tool to the coupling portion (the coupling) 52, the distance Y from the tip end to the base end of the unbalanced master 2 or the tool is in the range of 0.1 to 0.2X. At this time, if the amount of run-out of the tip end of the unbalanced master 2 or the tool is 100 μm, the amount of run-out of the base end thereof is 80 to 90 μm. If the total length of the unbalanced master 2 or the tool is 130 mm, an error that is caused in the measured amount of run-out is 0.08 to 0.15 μm/mm when the measurement position by the run-out amount measuring device 4 is shifted by increments of 1 mm in the axial direction L. Thus, this error is very small. Accordingly, even if the run-out amount measuring device 4 is slightly displaced in the axial direction L when being positioned so as to face the unbalanced master 2 or the tool at a predetermined position in the axial direction L, only a negligible amount of error is caused by such displacement in the axial direction L.

When measuring dynamic rigidity of the main shaft 6, the amount of run-out of the unbalanced master 2 is measured at a plurality of positions in the axial direction L by the run-out amount measuring device 4, and the dynamic rigidity of the main shaft 6 can be obtained as an average value of the respective values at the positions of the unbalanced master 2 in the axial direction L. When obtaining the dynamic rigidity of the main shaft 6, the dynamic rigidity may be corrected as appropriate according to the measurement positions of the unbalanced master 2 in the axial direction L.

As shown in FIG. 1, the dynamic rigidity measuring apparatus 1 of the present embodiment further includes a computing apparatus 10 for receiving data of the rotational speed v from the tachometer 3, and receiving data of the amount of run-out r' of the unbalanced master 2 from the run-out amount measuring device 4 to calculate dynamic rigidity.

Figure 8:
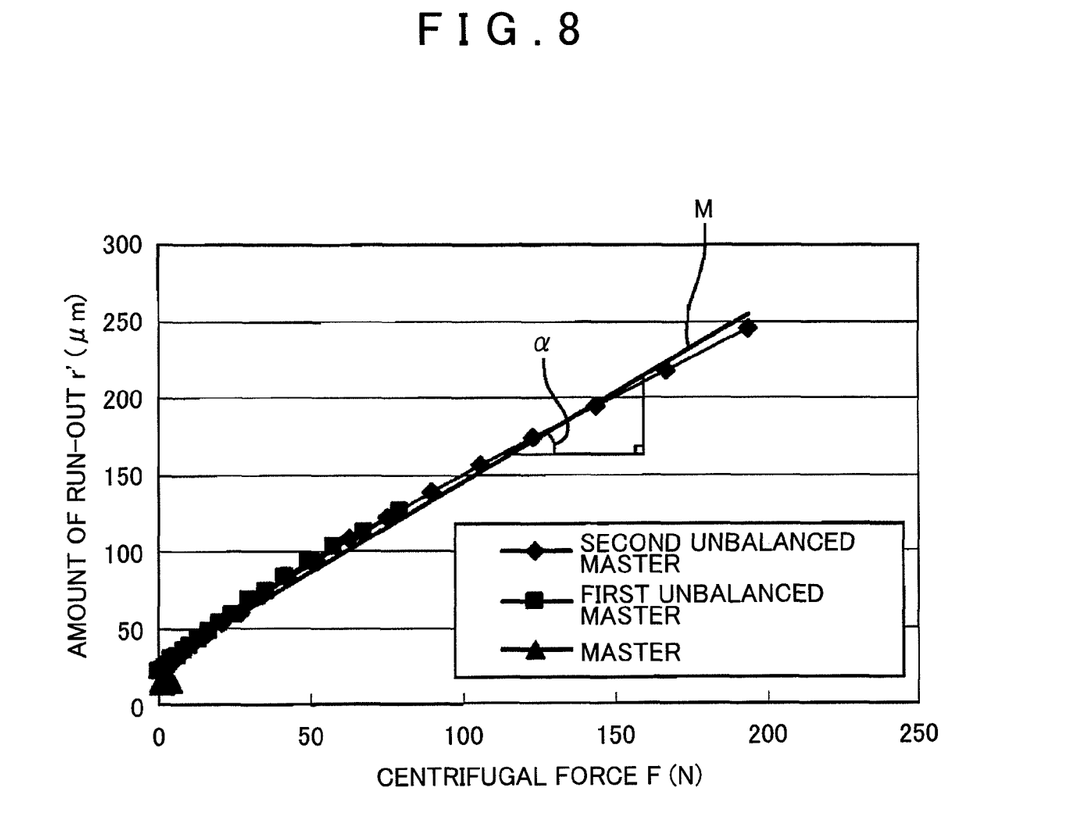
FIG. 8 is a graph showing the relation between the centrifugal force and the amount of run-out according to the first embodiment.

Provided that m represents the mass of the unbalanced master 2, r represents the amount of offset of the position A of the center of gravity of the unbalanced master 2 from the center of rotation O of the main shaft 6, $\omega$ represents the rotational angular velocity of the unbalanced master 2, and r' represents the amount of run-out of the unbalanced master 2 that rotates at this rotational angular velocity, the computing apparatus 10 is structured to calculate a centrifugal force F based on $F=m\times(r+r')\times\omega^2$, and to calculate dynamic rigidity G of the main shaft 6 based on $G=r'/F$. The computing apparatus 10 measures the amount of run-out r' and calculates the centrifugal force F while changing the rotational speed v of the main shaft 6 to which the unbalanced master 2 is attached. Thus, as shown in FIG. 8, the computing apparatus 10 can obtain the dynamic rigidity G of the main shaft 6 as a gradient $\alpha$ of a line M representing the relation between F and r'. The gradient $\alpha$ of the line M can be obtained by approximation using a least-square method, or the like.

A method for measuring the dynamic rigidity of the main shaft 6 by using the unbalanced master 2 will be described below with reference to the flowchart of FIG. 5.

Figure 5:
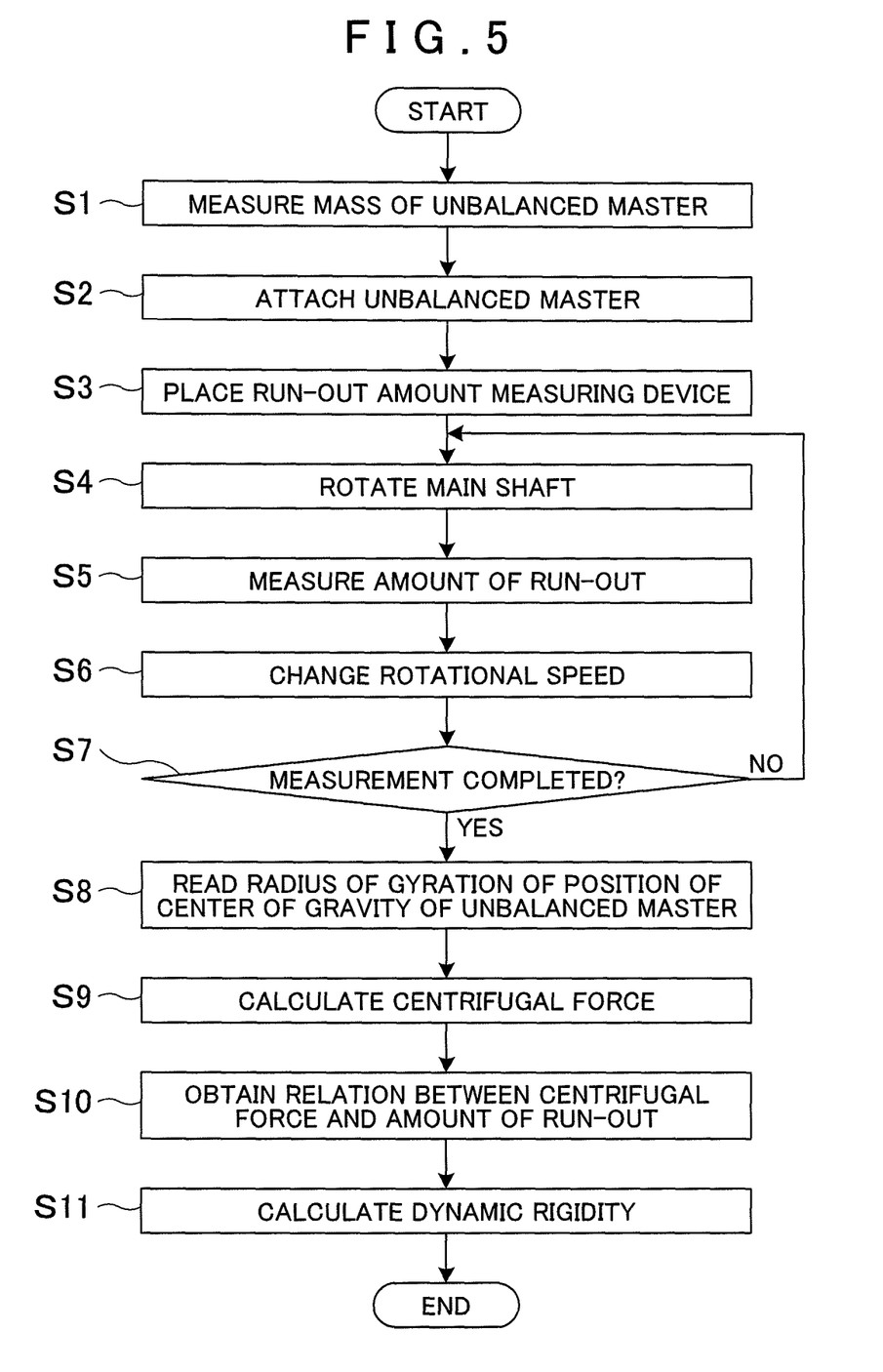
FIG. 5 is a flowchart illustrating a method for measuring dynamic rigidity according to the first embodiment.

First, the mass m of the unbalanced master 2 is measured (step S1 in FIG. 5).

Next, the unbalanced master 2 is attached to the main shaft 6 via the holder 7 (S2), and the run-out amount measuring device 4 is positioned at a predetermined distance from the center of rotation O of the main shaft 6 so as to face the unbalanced master 2 at a predetermined position in the axial direction L (S3). At this time, the run-out amount measuring device 4 can be positioned so as to face the unbalanced master 2 at any given position in the circumferential direction C.

Then, the main shaft 6 is rotated (S4), and the rotational speed v of the main shaft 6 is measured by the tachometer 3, and the amount of run-out r' of the unbalanced master 2 in a radial direction is measured by the run-out amount measuring device 4 (S5). At this time, the amount of run-out r' is measured while gradually changing (increasing) the rotational speed v of the main shaft 6 (S6), in order to obtain the relation between the rotational speed v and the amount of run-out r' (see FIG. 7). In the present embodiment, the rotational speed v of the main shaft 6 is increased by increments of 500 (rpm).

After the amounts of run-out are measured (S7), the computing apparatus 10 reads the radius r (mm) of gyration of the center of gravity of the unbalanced master 2 (the distance r from the center of rotation O of the main shaft 6 to the position A of the center of gravity of the unbalanced master 2) from CAD design data (S8). The computing apparatus 10 then calculates the centrifugal force F (N) based on $F=m\times(r+r')\times\omega^2$ by using the measured mass m (kg) of the unbalanced master 2, and using data of each of the measured amounts of run-out r' (mm) obtained at the respective rotational speeds v (respective rotational angular velocities $\omega$ (see S9, FIG. 6). At this time, provided that v represents the rotational speed (rpm), the rotational angular velocity $\omega$ (rad/sec) is obtained based on $\omega v/(2\pi\times60)$.

As shown in FIG. 8, the centrifugal force F (N) and the amount of run-out r' (μm) at each rotational speed v are plotted to obtain the gradient $\alpha$ of the line M showing the relation between F and r', by a least-square method (S10). Thus, the dynamic rigidity G (μm/N) of the main shaft 6 can be obtained as the gradient a of $G=r'/F$ (S11).

Figure 6:
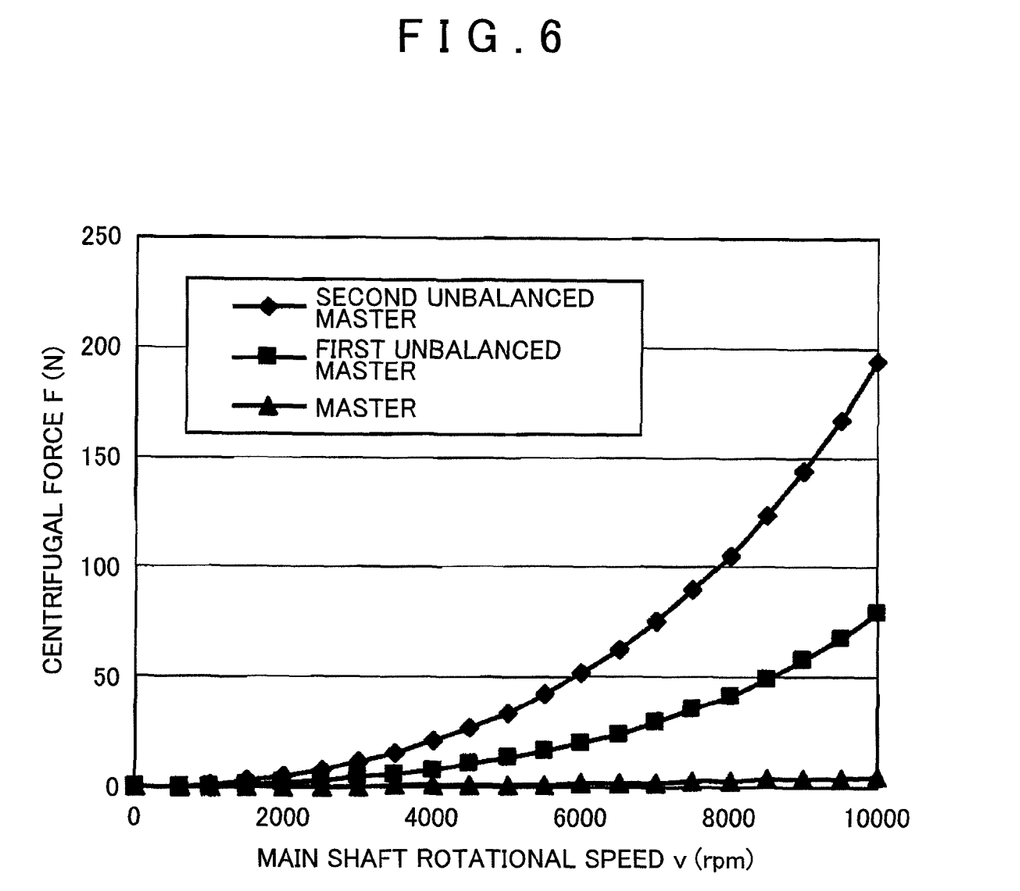
FIG. 6 is a graph showing the relation between the rotational speed of the main shaft and the centrifugal force according to the first embodiment.
Figure 7:
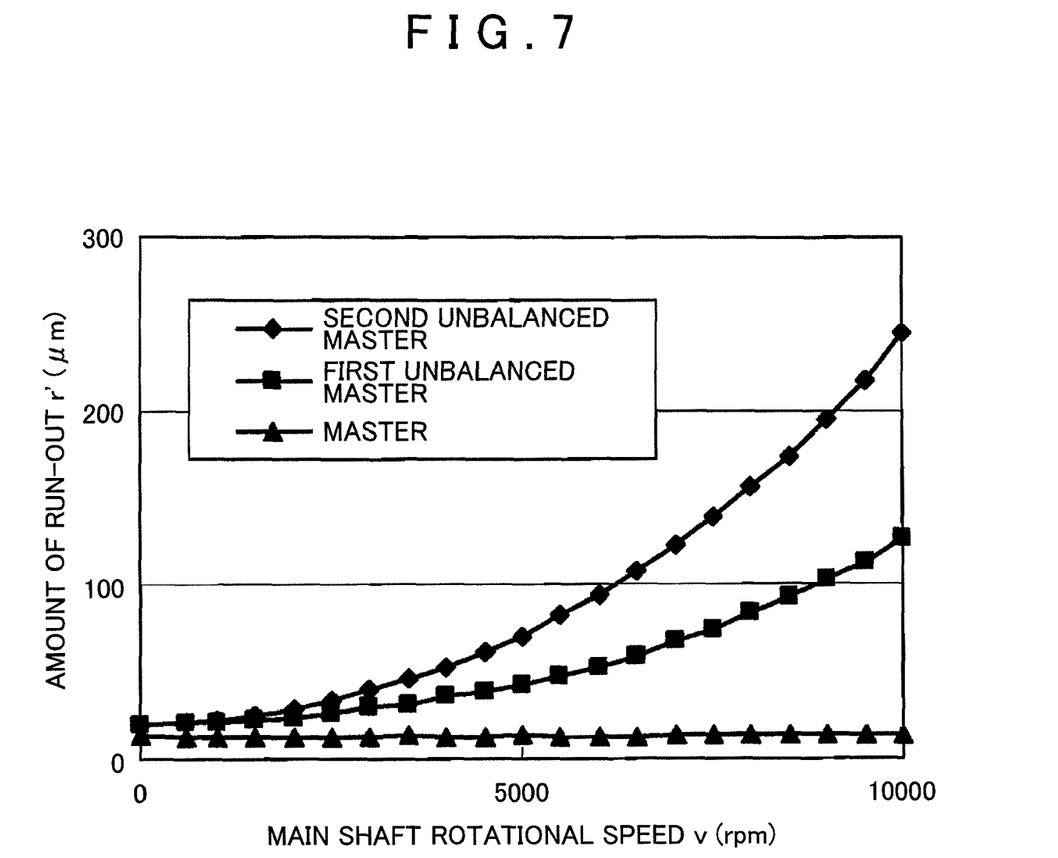
FIG. 7 is a graph showing the relation between the rotational speed of the main shaft and the amount of run-out according to the first embodiment.

FIG. 6 is a graph plotting the relation between the rotational speed v (rpm) of the main shaft 6 and the centrifugal force F (N) for the first unbalanced master 2 (FIG. 2) and the second unbalanced master 2 (FIG. 3) described above. FIG. 7 is a graph plotting the relation between the rotational speed v (rpm) of the main shaft 6 and the amount of run-out r' (μm) of the unbalanced master 2 for the first unbalanced master 2 (FIG. 2) and the second unbalanced master 2 (FIG. 3) described above. It can be seen from FIGS. 6 and 7 that the centrifugal force F and the amount of run-out r' increase like a quadratic function with an increase in rotational speed v.

FIG. 8 is a graph plotting the relation between the centrifugal force F (N) and the amount of run-out r' (μm) of the unbalanced master 2. It can be seen from FIG. 8 that the amount of run-out r' of the unbalanced master 2 is substantially proportional to the centrifugal force F. Thus, the gradient $\alpha$ of the line M can be obtained as the dynamic rigidity G of the main shaft 6.

The dynamic rigidity measuring apparatus 1 and method for measuring dynamic rigidity of the main shaft 6 of the machine tool 5 of the present embodiment use the unbalanced master 2, the tachometer 3, and the run-out amount measuring device 4. This enables the dynamic rigidity to be measured with high accuracy by an easy-to-handle apparatus.

More specifically, in the present embodiment, the unbalanced master 2 attached to the main shaft 6 via the holder 7 is rotated by rotation of the main shaft 6 of the machine tool 5. At this time, the unbalanced master 2 is subjected to the centrifugal force F since the position A of the center of gravity of the unbalanced master 2 is offset with respect to the center of rotation O of the main shaft 6. This centrifugal force causes the unbalanced master 2 to run out radially uniformly at each position in the circumferential direction C.

Thus, the run-out amount measuring device 4 of the present embodiment can be positioned so as to face the unbalanced master 2 at any given position in the circumferential direction C, in order to measure the amount of run-out r' of the unbalanced master 2. This can prevent an error to be caused in the measured amount of run-out r' depending on the position of the run-out amount measuring device 4 in the circumferential direction C of the main shaft 6 of the machine tool 5.

In the present embodiment, exciting force is generated by using the centrifugal force F generated by rotation of the unbalanced master 2. Thus, no external force needs to be applied to generate the exciting force, and the force that is generated by a rotating body itself as the main shaft 6, the holder 7, and the unbalanced master 2 can be used to generate the exciting force. Thus, the dynamic rigidity G of the main shaft 6 can be obtained with high accuracy by calculation based on the relation between the rotational speed v (the rotational angular velocity $\omega$) measured by the tachometer 3 and the amount of run-out r' measured by the run-out amount measuring device 4.

Figure 9:
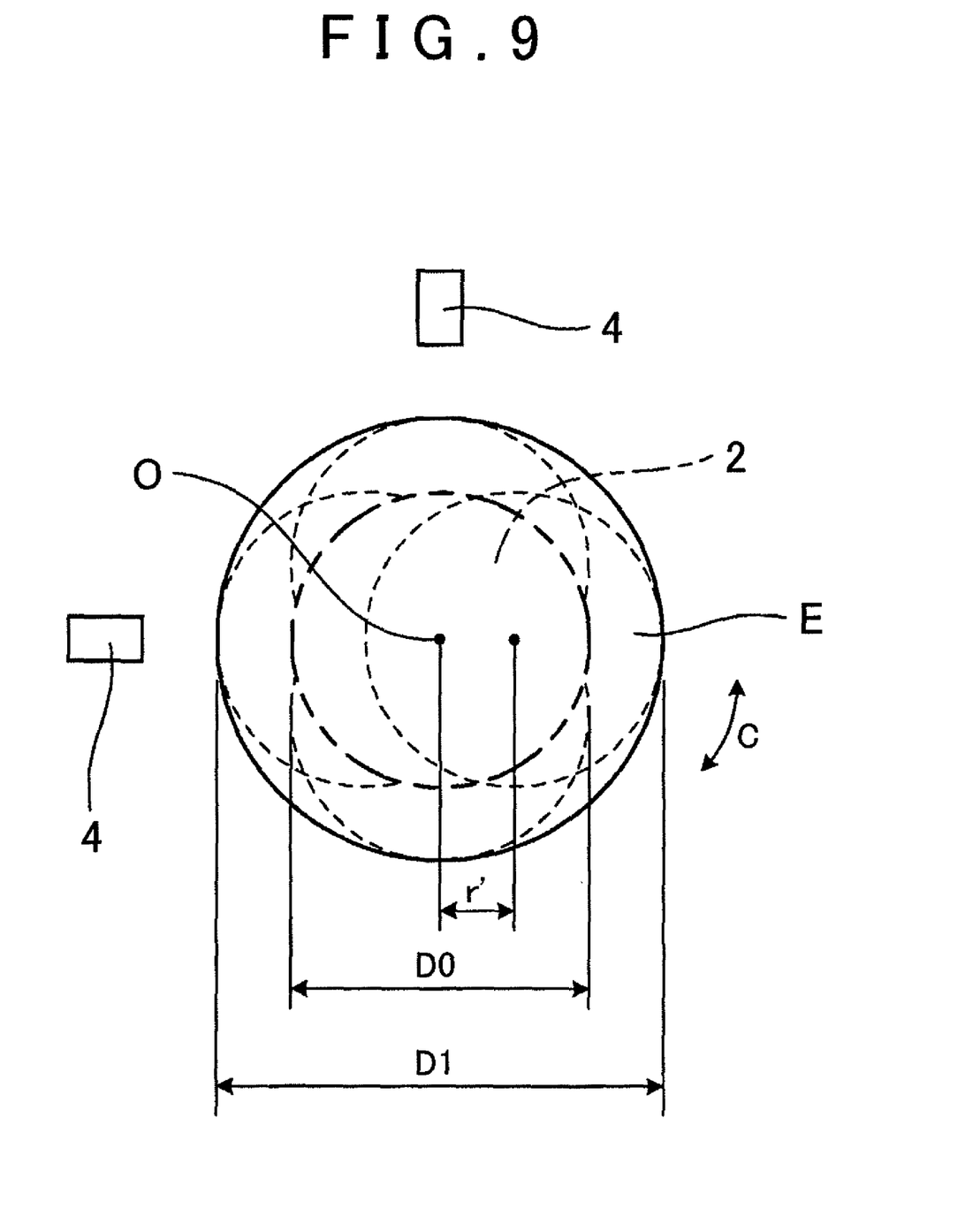
FIG. 9 is an illustration showing a state in which an unbalanced master runs out in the case where exciting force is applied to the main shaft by using the unbalanced master according to the first embodiment.
Figure 10:
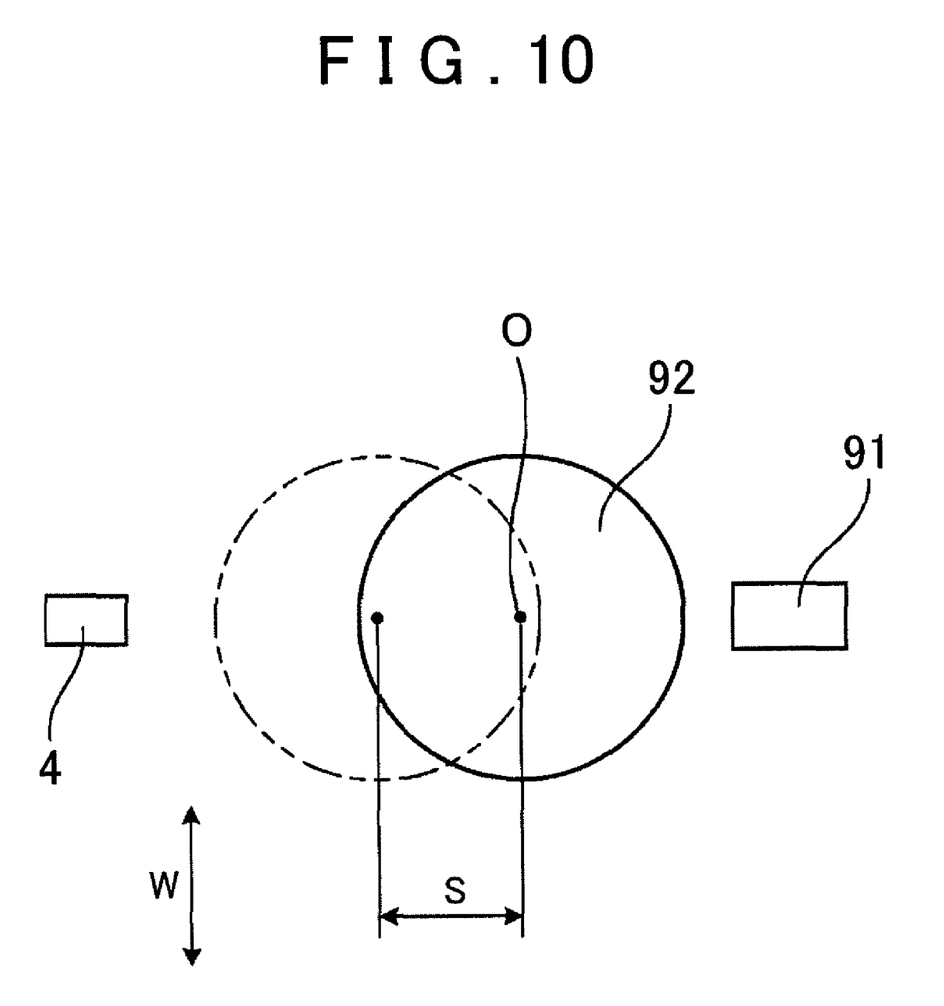
FIG. 10 is an illustration showing a state in which a tool runs out when exciting force is applied to a main shaft by using an electromagnet according to a conventional example.

FIG. 9 shows the case where the exciting force is applied to the main shaft 6 by using the unbalanced master 2 of the present embodiment. FIG. 10 shows the case where the exciting force is applied to a tool 92 in the main shaft 6 by using a conventional electromagnet 91.

In FIG. 10, when applying the exciting force to the tool 92 by using the electromagnet 91, the tool 92 runs out in a direction opposite to the electromagnet 91 while rotating. In this case, when measuring the amount of run-out s of the tool 92 from the direction opposite to the electromagnet 91, slight displacement of the run-out amount measuring device 4 in a lateral direction W from the position facing the electromagnet 91 causes an error in the measured amount of run-out s.

On the other hand, when rotating the unbalanced master 2 in FIG. 9, the unbalanced master 2 is excited equally in all directions of the circumferential direction C by the centrifugal force. Thus, even when the run-out amount measuring device 4 is positioned at a fixed distance from the center of rotation O so as to face the unbalanced master 2 at any given position in the circumferential direction C, substantially no error is caused in the measured amount of run-out r'. Note that D0 represents the diameter of the unbalanced master 2 while the unbalanced master 2 is stationary, D1 represents the diameter of the unbalanced master 2 during rotation of the unbalanced master 2, and E represents the range in which the unbalanced master 2 runs out.

The measured value of the dynamic rigidity can be used as various evaluation criteria for machine tools (processing machines).

For example, the dynamic rigidity value can be used to rate the performance of machine tools as an evaluation criteria for the machine tools. If a tool to be used has already been determined when determining machining conditions, the dynamic rigidity value serves as an index to determine machining conditions that satisfy required machining accuracy. If a tool to be used and machining conditions have already been determined when estimating machining accuracy, the dynamic rigidity value can be used to calculate estimated machining accuracy for performing the machining. When estimating machining accuracy, it can be determined if the estimated machining accuracy satisfies the machining accuracy required for a tool that is attached to the machine tool.

The dynamic rigidity value can be used to calculate estimated displacement of the main shaft due to run-out of a tool during machining and the cutting resistance, based on a tool to be used and machining conditions, in order to compensate for machining accuracy. If machining conditions have already been determined, the dynamic rigidity value serves as an index of a tool balance that satisfies required machining accuracy as a tool design criteria. Moreover, if machining conditions and required machining accuracy have already been determined, the dynamic rigidity value serves as an index to select a tool having an appropriate balance.

Second Embodiment

The present embodiment shows an example of compensating for machining accuracy of a machine tool 5 by using measured dynamic rigidity G. In the present embodiment, an end mill 2A as a machining tool is used in the machine tool 5.

A computing apparatus 10 of a dynamic rigidity measuring apparatus 1 either measures or reads the mass m of the end mill 2A from design data, reads a balance r of the end mill 2A (the distance from the center of rotation O of a main shaft to a position A of the center of gravity of the end mill 2A) from the design data, and reads data of the rotational speed v of the main shaft 6 during machining.

Then, by using the value of the dynamic rigidity G of the main shaft 6, which has been obtained in advance, an amount of run-out r' of the end mill 2A, which is estimated to be generated during machining with the end mill 2A, is calculated by $r'=(G \times m \times r \times \omega^2)/(1-G \times m \times \omega^2)$, which is obtained by modifying the expression $G=r'/F=r'/\{(G \times m \times (r+r') \times \omega^2)\}$. Then, the amount of displacement of the end mill 2A during machining is calculated in view of the cutting resistance. Thus, an estimated machining error, which is estimated to be generated during machining with the end mill 2A, is calculated, and the machining position of the end mill 2A is corrected to allow for the estimated machining error.

Figure 11:
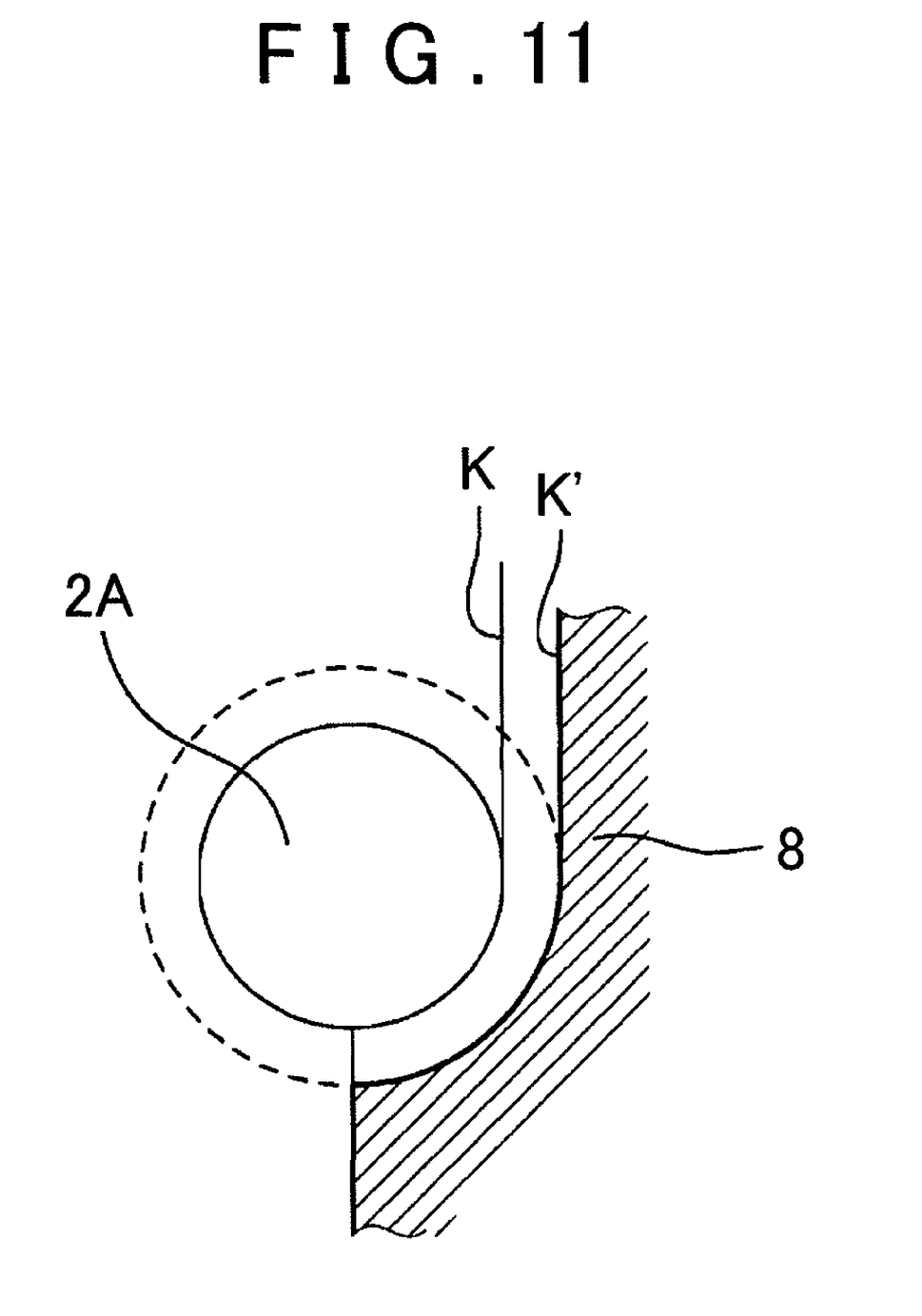
FIG. 11 is an illustration showing displacement of an end mill which is caused by run-out of a main shaft during machining according to a second embodiment.
Figure 12:
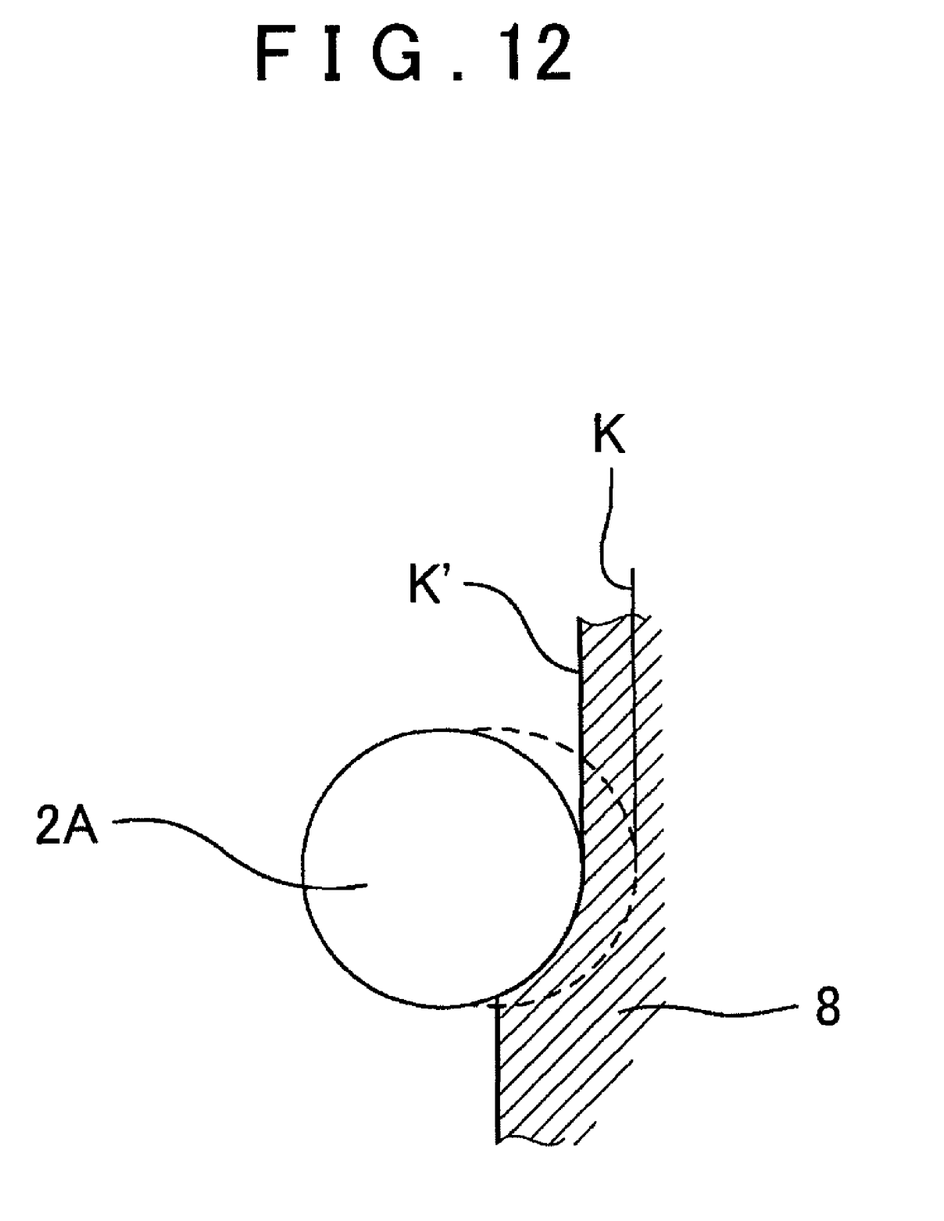
FIG. 12 is an illustration showing displacement of the end mill which is caused by cutting resistance during machining according to the second embodiment.

FIG. 11 shows that an actual machining line K' of a work 8 is displaced from a target machining line K due to displacement of the end mill 2A caused by run-out of the main shaft 6 during machining. FIG. 12 shows that an actual machining line K' of the work 8 is displaced from a target machining line K due to displacement of the end mill 2A caused by the cutting resistance applied to the end mill 2A during machining. In these cases, the actual machining line K' can be substantially matched with the target machining line K by correcting the machining position of the end mill 2A.

Thus, the machining accuracy for the work 8 can be increased if the dynamic rigidity G of the main shaft 6 of the machine tool 5 can be obtained with high accuracy.

What is claimed is:

1. An apparatus for measuring dynamic rigidity of a main shaft of a machine tool, characterized by comprising:

an unbalanced master that is attached to the main shaft via a holder and of which position of a center of gravity is offset with respect to a center of rotation of the main shaft so that an exciting force of the unbalanced master is generated by rotation of the main shaft;

a tachometer that measures a rotational speed of the main shaft; and a run-out amount measuring device that is positioned so as to face the unbalanced master at a position that is a predetermined position in an axial direction and is any given position in a circumferential direction, and that measures an amount of run-out of the unbalanced master when the exciting force is generated, wherein the dynamic rigidity of the main shaft is calculated based on a relation between the rotational speed measured by the tachometer and the amount of run-out measured by the run-out amount measuring device.

2. The apparatus according to claim 1, characterized in that a centrifugal force F is calculated based on $F=m\times(r+r')\times \omega 2$, and the dynamic rigidity G is calculated based on $G=r'/F$, wherein m represents mass of the unbalanced master, r represents an amount of offset of the position of the center of gravity of the unbalanced master with respect to the center of rotation of the main shaft, $\omega$ represents a rotational angular velocity of the unbalanced master, and r' represents an amount of run-out of the unbalanced master that rotates at the rotational angular velocity.

3. The apparatus according to claim 1, characterized in that the unbalanced master is shaped so that a part of a cylindrical material in a circumferential direction is cut out along an axial direction.

4. A method for measuring dynamic rigidity of a main shaft of a machine tool, characterized by comprising:

using an unbalanced master of which position of a center of gravity is offset with respect to a center of rotation of the main shaft;

attaching the unbalanced master to the main shaft via a holder, and positioning a run-out amount measuring device so as to face the unbalanced master at a position that is a predetermined position in an axial direction and is any given position in a circumferential direction so that an exciting force of the unbalanced master is generated by rotation of the main shaft;

measuring, by the run-out amount measuring device, an amount of run-out of the unbalanced master when the unbalanced master is rotated and the exciting force of the unbalanced master is generated by the rotation of the main shaft; and calculating the dynamic rigidity of the main shaft based on a relation between a rotational speed of the main shaft and the amount of run-out measured by the run-out amount measuring device.

5. The method according to claim 4, characterized in that a centrifugal force F is calculated based on $F=m\times(r+r')\times \omega 2$, and the dynamic rigidity G is calculated based on $G=r'/F$, wherein m represents mass of the unbalanced master, r represents an amount of offset of the position of the center of gravity of the unbalanced master with respect to the center of rotation of the main shaft, $\omega$ represents a rotational angular velocity of the unbalanced master, and r' represents an amount of run-out of the unbalanced master that rotates at the rotational angular velocity.

6. The method according to claim 4, characterized in that the unbalanced master is shaped so that a part of a cylindrical material in a circumferential direction is cut out along an axial direction.

\* \* \* \* \*